April 28, 1959 V. G. CONVERSE III, ET AL 2,884,113
CONVEYOR SYSTEM
Filed Jan. 11, 1956
10 Sheets-Sheet 1

INVENTORS
Vernon G. Converse III
Lee J. Seymour
Roland E. Hohnsel
Josef Sabuda
BY Harness, Dickey & Pierce
ATTORNEYS

United States Patent Office 2,884,113
Patented Apr. 28, 1959

2,884,113

CONVEYOR SYSTEM

Vernon G. Converse III, Franklin, Lee J. Seymour and Roland Earl Hohisel, Detroit, and Josef Sabuda, Livonia, Mich., assignors to George L. Nankervis Company, Detroit, Mich., a corporation of Michigan Application January 11, 1956, Serial No. 558,465

19 Claims. (Cl. 198—19)

In the machining, testing or treating of workpieces on a production basis, it is customary to provide a plurality of similar machines, test stands or treating stations if the operating or processing rate of one unit is less than the required rate of total production. The necessity for such multiplying of equipment may arise either where a single operation or treatment is to be performed effectively separately of any other production facility or where that operation or treatment is one of several performed on a serial basis on a production line.

In common practice, workpieces are supplied to and removed from the several similar work stations either manually or by providing a plurality of parallel or branching conveyor lines, with each conveyor line being individual and exclusive to one work station. A substantial reduction in equipment investment and floor area requirements can be expected to accrue from the sharing of a single conveyor line by a plurality of the similar work stations, with each work station both receiving unprocessed workpieces from and returning processed workpieces to the same conveyor. However, in such an arrangement, both processed and unprocessed workpieces are conveyed to and pass at least some of the stations, necessitating that each of those work stations possess the capability of accepting only unprocessed workpieces.

In the disclosed embodiment of the invention, a plurality of similar work stations are disposed adjacent a single conveyor line. That single line carries both workpieces upon which the operation or treatment is yet to be performed and workpieces upon which the operation or treatment has been completed. Control equipment is provided at each work station, cooperating with elements of the conveyor line proper, capable of effectively discriminating between the processed and unprocessed workpieces and of directing into the work station only unprocessed workpieces. After the operation is completed or the treatment is performed, the equipment is adapted to return the processed workpiece to the line in a manner to permit its completed status to be detected by control equipments at subsequent stations. The time at which any processed workpiece is returned to the line may be totally independent of the time at which the workpiece from any other similar work station is returned to the line.

The conveyor may be of a straight-line nature and exhaust into another conveyor system of the same or a different type or into an unloading station remotely located from the loading station. It is advantageous in many instances, however, to employ a closed-loop or return-type conveyor in which the loading and unloading stations are conveniently, but not necessarily, adjacent or the same.

In the representative mode of utilizing the inventive principles disclosed herein, the workpieces (exemplarily engines to be tested) are carried upon pallets which are adapted to slide upon a roller-type track. A driven, endless chain, disposed beneath the rollers, carries a plurality of pins each of which is adapted to engage a towing aperture in each of the pallets. Each pin is slidably retained within a pin body so that the pin may be moved transversely of the chain between an extended and a retracted position. In its extended position, the driving end of the pin is appropriately located to engage and drive a pallet; in its retracted position, the driving end of the pin is disposed a distance from the pallet plane and will pass in spaced proximity to but will not engage the pallet.

While other arrangements may be employed, green or untreated workpieces are uniquely distinguished from completed workpieces by associating the pallets with an appropriate one of two groups of uniquely different pin assemblies. One group of the pins is designed and adapted to engage and move only pallets carrying unprocessed workpieces, while the remaining pins forming a second group, are designed and adapted to engage and move only pallets carrying processed workpieces, the two types of pins desirably being alternated along the chain. Thus, the control equipment at each work station may discriminate between processed and unprocessed workpieces by sensing the type of pin assembly which is associated with each succeeding workpiece. In practice, all of the pins in either group of pins need not be transporting pallets at any one time, and all pallets need not be carrying workpieces at any one time. Hence, the control equipment is preferably imbued with the additional capability of detecting that a pin is in fact transporting a pallet and that the pallet is in fact carrying a workpiece.

A work station which is empty of a workpiece, and of the pallet upon which the workpiece is carried, is in a position to accept from the conveyor line the next unprocessed workpiece to arrive at a point adjacent that work station. Consequently, the control equipment will signal the arrival at that point of one of the first group of pins which is transporting a pallet with a workpiece loaded thereon. At the instant of arrival, actuating means are energized to move the pin to its retracted position until it has moved past the pallet which it was carrying. As a result, forward motion of the pallet is terminated at a point aligned with the work station. Other equipment at the work station is then energized to draw the pallet, with its load, into the work station and to the work location. Any appropriate operation or treatment may then be performed.

At the completion of the operation or treatment, the control equipment at the station again senses each of the succeeding pins and signals the approach to the work station of the first one of the second group of pins which is not transporting a pallet. At this signal, the pallet carrying the finished workpiece is moved back to the conveyor line, the selected second-group pin is retracted prior to contact with the pallet and is extended at an appropriate time to engage the towing aperture of the pallet so as to establish a driving engagement with the pallet.

At the unloading station, the processed part is removed from the pallet with which it is associated. The pallet is then loaded with an unprocessed workpiece and is transferred from the second-group pin to a first-group pin in order that the unprocessed status of the workpiece may be detected by the equipment at the work stations.

A more complete understanding of the nature of the invention, and its objects and features, may be obtained from the following detailed description of an embodiment of the invention when read with reference to the accompanying drawings in which:

Fig. 6 is a vertical sectional view, partially cut away, taken substantially along the line 6—6 of Fig. 4;

Figures 1, 14:
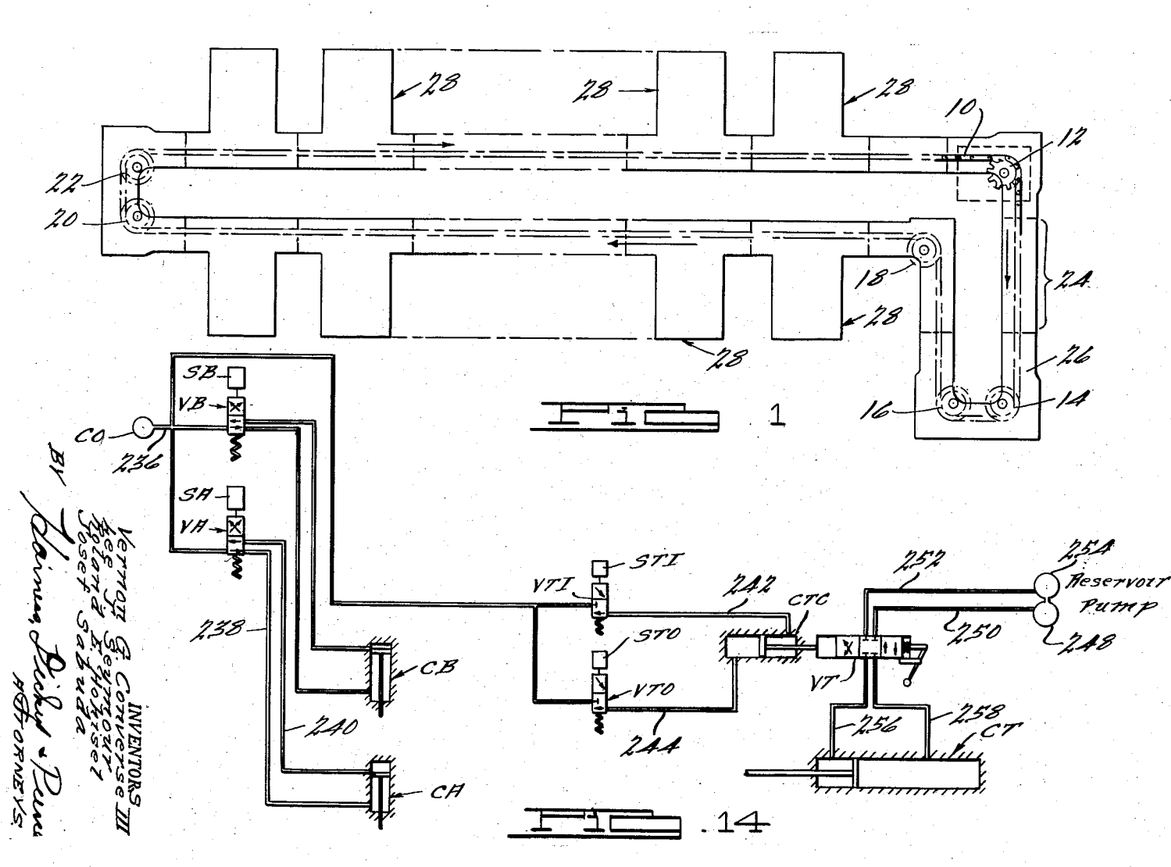
Figure 1 is a schematic, plan representation of a conveyor and work station system embodying the principles of the present invention.
Fig. 14 is a schematic representation of pneumatic and hydraulic control equipment suitable for employment at each of the work stations.

A representative conveyor system embodying the principles of the invention is shown in Fig. 1 of the drawings. In that closed-looped system, a conveyor chain 10, or its equivalent counterparts in the art to which the term chain is intended to be generic, is trained around a drive sprocket 12, and idler sprockets 14—22. The L-shaped configuration is representatively employed in order to provide an adequate area for a load and unload station 24 as well as to provide takeup space on the conveyor to an extent determined by the size of the unit 26.

A plurality of similar or identical work stations 28 are disposed adjacent the chain 10 so that a workpiece loaded upon the conveyor system at station 24 may be transported, representatively in a clockwise direction, past one or more of the stations 28. Each of the work stations 28 which is at any instant empty of a workpiece is in condition to withdraw from the conveyor line an unprocessed workpiece. Normally, therefore, upon the initial operation of the system, workpieces sequentially loaded upon the conveyor system at station 24 will be sequentially fed into the work stations 28 until all such work stations are full. In a pragmatic embodiment of the invention, twenty-four work stations 28 are provided along the conveyor-chain length so that, normally, the first twenty-four workpieces will be directed to the succeeding ones of those work stations. Additional unprocessed workpieces upon the conveyor system will continue to circulate until such time as a demand is made therefore by one of the work stations 28.

When any one of the work stations 28 has completed the operation or treatment performed thereat, the processed workpiece is returned to the conveyor line and that work station is prepared to accept an unprocessed workpiece. The processed workpieces are transported by means including the conveyor chain 10 back to the load and unload station 24 where they are manually or mechanically removed from the conveyor system.

The nature of the work operation or treatment performed at the work stations is not significant to the inventive concepts involved. As illustrated herein, the conveyor system is employed to transport automobile engines to and from a plurality of test stations 28, portions of one of which are represented in Figs. 2 to 7 of the drawings. A base 30 (Fig. 2) supports a conveyor-portion unit 32 and a test stand unit 34, means being provided to transfer an engine 36 from the conveyor line portion 32 (Fig. 3) into the test stand unit 34 (Fig. 2) and, after the testing operation is completed, back to the conveyor unit 32.

Figure 2:
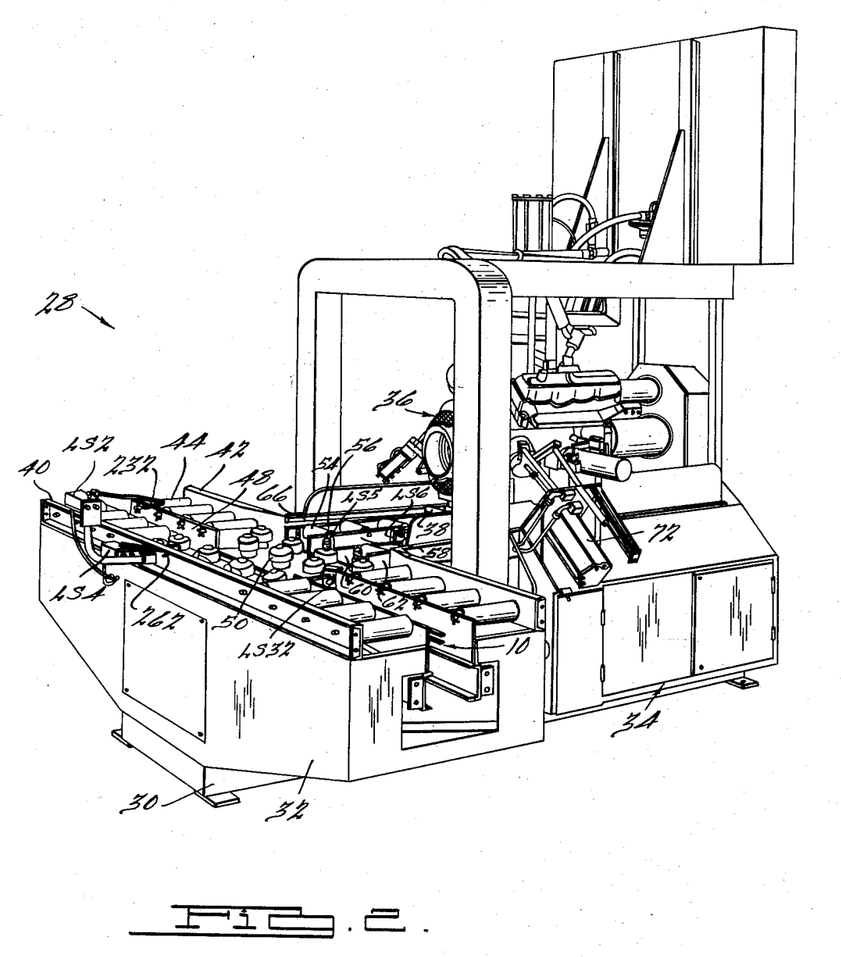
Fig. 2 is a perspective view of the equipment at one of the work stations and the portion of the conveyor line thereat, with the workpiece in work location.
Figure 3:
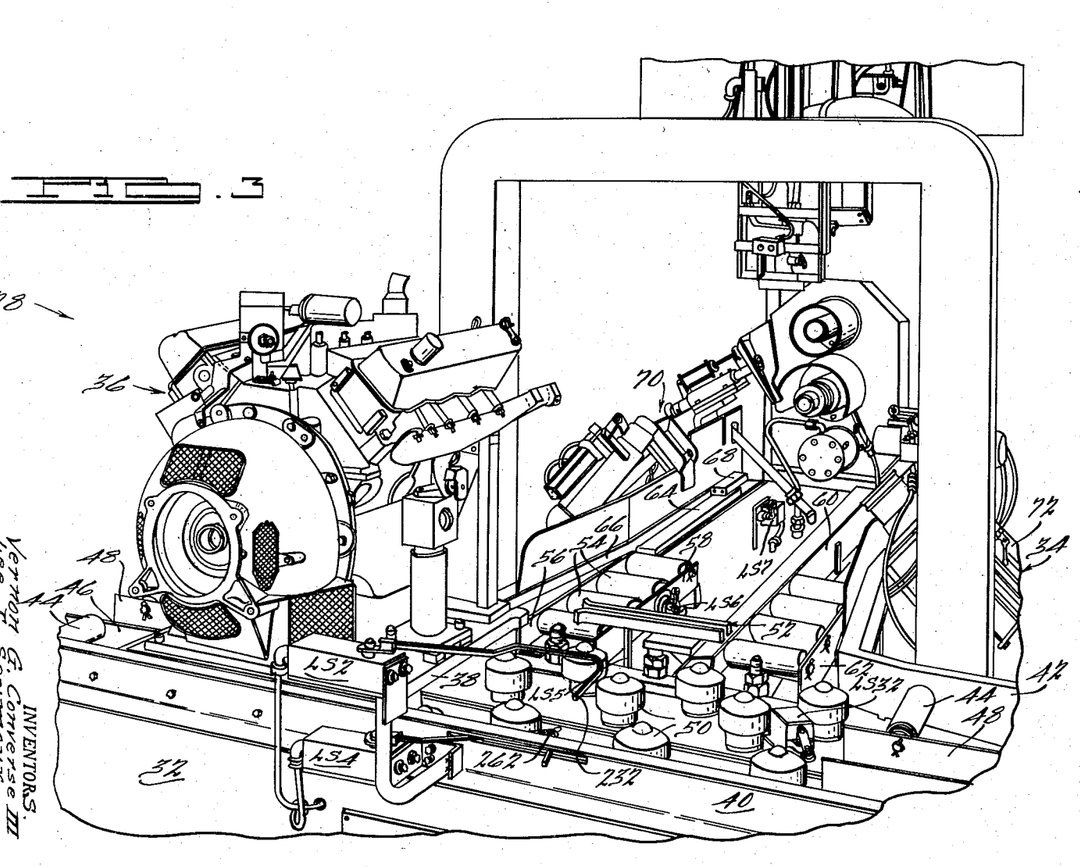
Fig. 3 is a perspective view of the apparatus in Fig. 2 showing a workpiece in position to be released from the conveyor line and transported into the work station.

The engine 36 is mounted, by means of suitable fixtures, upon a heavy plate pallet 38 which is slideable between channel side members 40 and 42 (Figs. 2, 4 and 5) and upon a series of rollers 44. Two rows of rollers 44 are provided, one row being rotatably mounted on shafts extending between side member 40 and angle bracket 46 and the other row of rollers 44 being mounted upon shafts extending between the other side member 42 and bracket 48. The pallets 38, and the engines 36 carried thereby, are advanced along the conveyor by transporting means hereinafter to be described associated with the chain 10 (Figs. 2 and 6).

If pallet 38 is carrying an untested engine, and if the test stand unit 34 is in condition to receive an engine, the control equipment will cause the transporting means to become disengaged from pallet 38 at a time when pallet 38 is aligned with the test stand sub-conveyor equipment. At this point, the pallet 38 will be resting upon the ball-type supporting units 50 rather than upon any of the rollers 44, so that the pallet may be readily translated transversely of the main conveyor line. Additionally, a projecting tongue portion 51 (Figs. 5 and 6) on the pallet 38 is engaged by a puller bar assembly 52 comprising a pair of spaced-apart bars the leading ends of which are splayed (Figs. 3 and 4) to insure alignment between those bars and the tongue 51 on the pallet 38.

The puller bar assembly 52 is then retracted to the rear of the test stand portion 34, drawing the pallet 38 and its load into the test stand. During the initial part of its travel in the test stand portion 34, the pallet 38 is supported on a plurality of rollers 54 mounted in two rows between angles 56—58 and 60—62, respectively. During the final portion of its travel in the stand 34, the pallet 38 is supported upon gibs 64 (Figs. 3 and 4) so that the workpiece will be solidly supported during the work operation. Wear strips 66 guide the pallet laterally, and stop-blocks, such as stop-block 68 (Fig. 3) define the work position of the pallet 38.

The test equipment such as 70 and 72 (Figs. 2 and 3) is associated with the engine, and the test operations are performed. The test equipment is not part of the present invention and is disclosed solely to show a representative environment in which the principles of the invention may be utilized.

At the completion of the test operation, which may be at the end of a final step independently of time, which may result from the expiration of a selected time interval, or which may be manually determined by an inspector, the pallet 38 is returned to a position upon the supporting units 50 by means including the puller bar assembly 52. The pallet 38 is there engaged by the aforesaid transporting means, in a fashion hereinafter to be described, to be transported to the unload station 24 (Fig. 1) at which the engine 36 is removed from the pallet 38.

Figure 4:
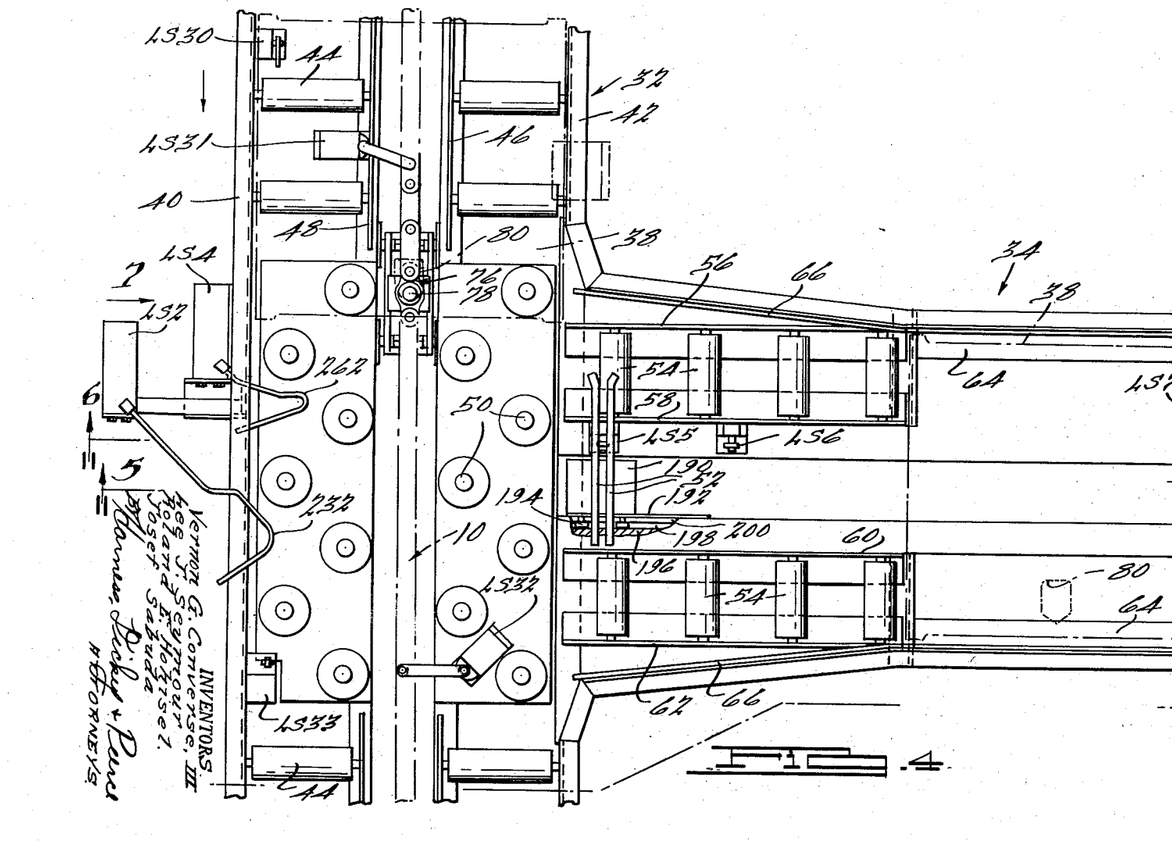
Fig. 4 is a plan view of the equipment of Figs. 2 and 3 without a workpiece at the station.

The workpieces are transported on the main conveyor by means of the chain 10 and a plurality of individual transporting means each of which includes, in the shown arrangement, a pallet 38 and a pin assembly 76 (Figs. 4 and 6). Each pin assembly 76 includes a pin 78 which is adapted to engage an aperture 80 near the forward edge of each of the pallets 38, those pallets being represented in phantom in Figs. 4 to 6 of the drawings.

Each of the pins 78 is slidably supported so that it may be moved transversely of the chain 10 between an extended and a retracted position. When extended, the upper end of the pin (in the representative showing) lies in or above the plane of the pallets so that, if the pin is in engagement with the pallet, the movement of the chain will be transmitted to the pallet via the pin. When the pin is retracted, its upper end lies below the plane of the pallet so that movement of the pin will not be communicated to any pallet.

Figure 10:
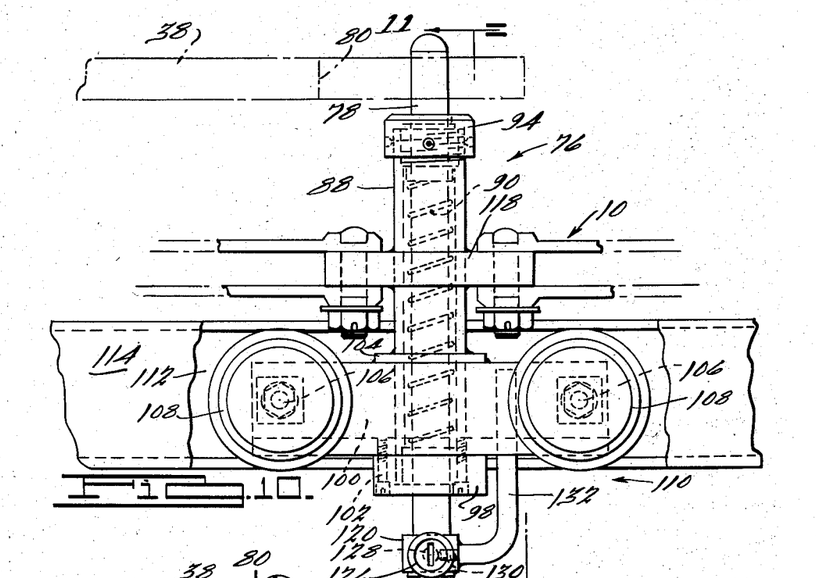
Fig. 10 is a vertical sectional view, partially cut away, taken substantially along the line 10—10 of Fig. 6, showing one of the pin assemblies which may be employed.
Figure 11:
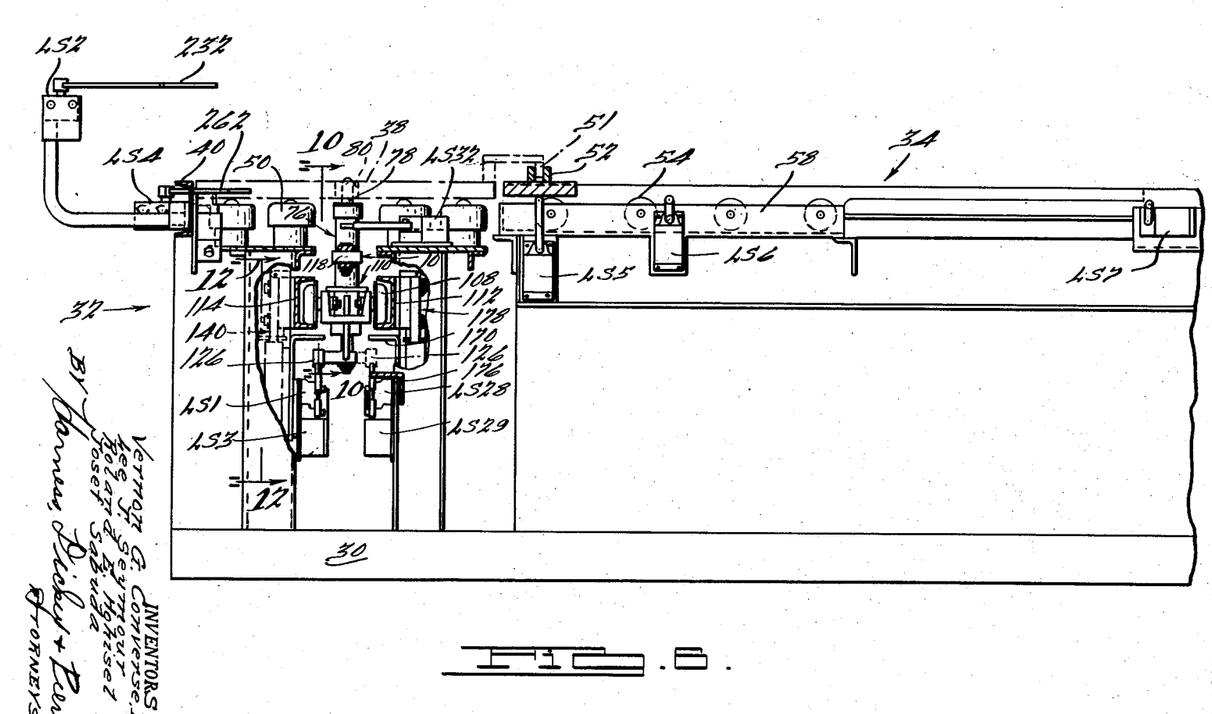
Fig. 11 is a vertical sectional view taken substantially along the line 11—11 of Fig. 10.

In the representative assembly shown in Fig. 6 and in the sectional views of Figs. 10 and 11, each pin 78 is slidably supported in a pair of spaced-apart sleeve bearings 84 and 86 (Fig. 11) which are seated within a tubular pin body 88. The pin 78 is biased upwardly by a compression spring 90 extending between the upper surface of the lower sleeve bearing 86 and the under surface of an annular shoulder 92 integral with the pin 78. The upper limit of motion of pin 78 is established by the engagement of the annular shoulder 92 with the upper sleeve bearing 84 which is retained against upward movement by a top cap 94 screwed upon the pin body 88, a seal 96 being interposed those parts. The lower sleeve bearing 86 is retained in position by a bottom cap or socket 98 secured to the web of a channel 100 by means such as screws 102. The web of channel 100 (Figs. 10 and 11) is apertured to accept and is welded to the pin body 88. The structural rigidity may also be enhanced by welding a centrally apertured plate 104 both to the pin body 88 and to the ends of the flanges of the channel 100.

Each flange of channel 100 is apertured to accept and support a pair of shafts 106 each of which serves as an axle for a wheel 108. The channel 100, the plate 104, the axles 106 and the wheels 108 are constituent elements of a pin dolly assembly 110. Wheels 108 are adapted to ride upon the lower flanges of a pair of channel-section rails 112 and 114 constituting a pin dolly track extending parallel to and coextensively with the chain 10. Rails 112 and 114 are rigidly supported throughout their length so that the wheels 108 may support not only the pin assembly but also the chain 10. A link 118 of the chain 10 is centrally apertured to accept and is welded to the pin body 88, each of the links 118 being joined to adjacent chain links in any appropriate fashion. As a result, the pin body 88 and the pin dolly assembly 110 are effectively integral with the chain 10 and are continuously moved in translation therewith at any time that the chain is being driven.

An apertured, laterally extending arm 120 is secured to a reduced-diameter portion 122 at the lower end of pin 78 by means such as a screw 124 engaging a tapped aperture in the lower end of the pin 78. Arm 120 rotatably supports a cam follower 126 by means of a shaft 128 retained in an aperture in the arm 120 by means of a set screw 130. In the preferred arrangement, the pin 78 is held against rotation about its own longitudinal axis by means of a generally L-shaped torque rod 132. The lower end of torque rod 132 is secured to one side face of the arm 120 such as by welding while the upstanding leg thereof slidably engages an aperture in the web of the channel 100.

As has hereinbefore been stated, it is necessary that the control equipment at the several stations be capable of distinguishing between a workpiece which has not yet been processed and a workpiece which has been fully processsed. In the representative arrangement, this is accomplished by associating pallets carrying unfinished workpieces with one type of pin assembly 76 and by associating pallets carrying finished workpieces on another type of pin assembly 76. The distinction between the two types of pin assemblies, which are alternated along the chain 10, lies in whether arm 120 and cam follower 126 extend to the left, as shown in Fig. 11 of the drawings, or to the right. Hence, one-half of the total supplied pins are provided with arms 120 and cam followers 126 which extend to the right in the view of Fig. 11, with the lower end of the torque rod 132 being welded to the other face of the arm 120. For convenience of reference, pins arranged in accordance with the showing of Fig. 11 will be denoted "A" pins, and pins in which the arm 120 and cam follower 126 extend to the right will be denoted "B" pins.

A pallet carrying an unprocessed workpiece which is to be transferred into a work station is deposited adjacent the work station by moving the pin carrying that pallet transversely of the chain (representatively in a downward direction) to move the upper end of that pin out of engagement with the pallet. Similarly, when the workpiece is completed and returned to the main conveyor line, engagement is secured between a pin and the pallet to transport the pallet along the main conveyor line by retracting the selected pin prior to its arrival at the work station, and releasing it at an appropriate point to permit it to enter the towing aperture in the pallet and transport the pallet along the conveyor line. At the load and unload station, as above noted, each pallet carrying a completed workpiece is transferred from one of the group of pins assigned the task of carrying completed workpieces to one of the pins assigned to carry unprocessed workpieces. In all these cases, means must be provided at the station to cause a selective retraction of the pin. This means comprises an actuating means or actuator mechanism 140 best shown in Figs. 12 and 13 of the drawings, with the cooperational relationship between this actuating means and the remaining elements of the system best being shown in Figs. 6 and 7 of the drawings.

Figures 12, 13:
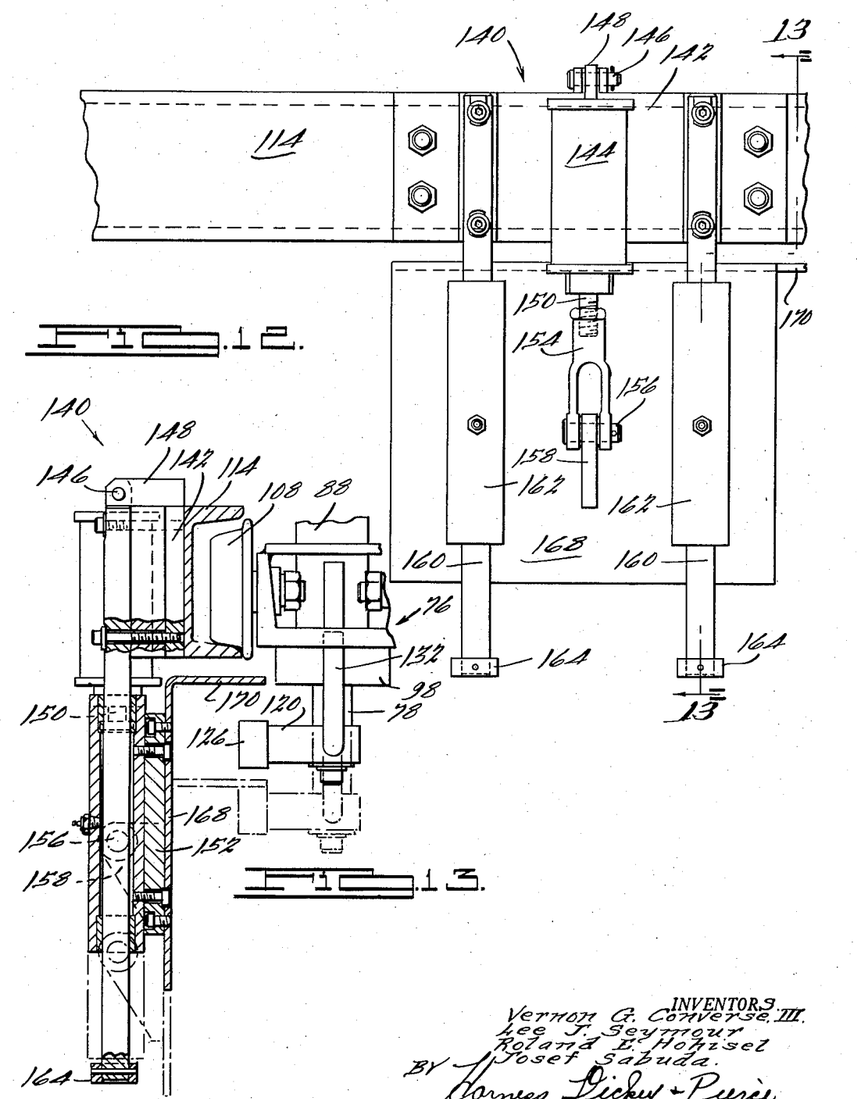
Fig. 12 is a vertical sectional view taken substantially along the line 12—12 of Fig. 6, showing one of the actuator mechanisms for controlling the selective position of the pins shown in Figs. 10 and 11 of the drawings.
Fig. 13 is a vertical sectional view taken substantially along the line 13—13 of Fig. 12.

The actuator mechanism 140 comprises a plate 142 bolted or otherwise secured at an appropriate point to dolly track 112 or 114 depending upon whether the actautor is to control an "A" pin assembly or a "B" pin assembly. The actuator mechanism disclosed in Figs. 12 and 13 is an "A" pin actuator and, therefore, is secured to track 114. The "B" pin actuator assembly is a mirror image of the "A" pin actuator assembly.

An actuating cylinder 144 is secured by means of a pin 146 to an overhanging arm 148 welded or otherwise attached to the plate 142. Cylinder 144 may be either pneumatically or hydraulically driven, the former being exemplarily employed in the disclosed arrangement. The piston rod 150 of the actuating cylinder 144 is connected to a movable plate 152 by means of a clevis 154, a pin 156, and an apertured projection 158 welded to or formed integrally with the plate 152. Upon extension of the piston rod 150, the plate 152 will be lowered and upon retraction of the piston rod 150, the plate 152 will be raised. This movement of plate 152 is guided by means of a pair of guide pins 160 bolted or otherwise secured to the plate 142 and slideable within guide housings 162 attached to the movable plate 152. Stop rings 164 may be pinned or otherwise secured to the lower ends of the rods 160 to define a limit stop to the downward motion of the plate 152.

A plate 168 is secured to the inner face of the plate 152, with the upper end of plate 168 being formed over into a horizontal plane to establish a camming surface 170. In the retracted position of piston rod 150, the parts are in the position represented in Fig. 13 of the drawings, with the camming surface 170 spaced substantially above the cam follower 126 of the pin assembly 76. However, when actuating cylinder 144 is caused to drive its piston rod 150 downwardly, camming surface 170 is moved downwardly to the position represented in phantom in Fig. 13, engaging the cam follower 126 during the course of its motion and carrying the cam follower 126 to the position represented in phantom in Fig. 13. The movement of cam follower 126 produces a translational motion of the pin 78 transversely of the axis of the chain 10 to bring the upper end of pin 78 (Figs. 10 and 11) below the level of the pallet 38. A roller is employed as the cam follower 128 in view of the fact that the chain 10 and hence the pin assembly is moving relatively to the camming surface 170 during any period of engagement of those elements while the machine is in operation.

In order for a pin to release a pallet, the pin must be moved downwardly and retained in its downward position until it has moved a distance at least equal to the distance between the towing hole and the forward end of the pallet; while in engaging a pallet, the pin must be moved to its lower position at a point prior to the time at which it would strike the rear end of the pallet and must then be maintained in its lower position until it is aligned with the towing hole in the pallet. These lengths of movement in the lower position of the pin will, therefore, be determined by the location of the towing hole in the pallet. In the disclosed representative arrangement, the towing hole 80 in the pallet 38 (Figs. 4 and 11), is located near the forward edge of the pallet. Hence, the "A" pin in releasing the pallet at a work station must be down only a relatively short distance while the "B" pin in engaging a pallet must be in its down position for substantially the full length of the pallet. It is feasible to provide camming surfaces 170 (Fig. 13) of appropriate length in each case to accomplish this result. However, in the disclosed arrangement, the camming surfaces 170 on both the "A" pin and the "B" pin actuator mechanisms are made of equal lengths. At the work stations, an angle is permanently fixed in position at a level such that its horizontal leg is coplanar with the camming surface 170 of the "B" pin actuator mechanism when that camming surface is in its lower position. Thus, the "B" pin bridge 176 (Figs. 6 and 7) is secured in position so that the under surface of its horizontal leg will be in alignment with the camming surface 170 of the "B" pin actuator mechanism 178 when that camming surface is in its lowermost position. Hence, the cam follower 126 of the "B" pin will be drawn downwardly by the camming surface 170, will travel from that camming surface to the under surface of the horizontal leg of the bridge 176 and will be held down until the "B" pin dolly has been traversed sufficiently to the right (Fig. 7) to clear the end of bridge 176. As may best be seen in Fig. 7 of the drawings, the "B" pin actuator 178 is appropriately located so that its left-hand end is to the left of the rear edge of the pallet 38 when that pallet is in a position in front of the work station. The right-hand end of bridge 176 is appropriately located so that upon the release of the "B" pin, its upper end will enter the towing hole 80 (Fig. 6) in the pallet 38 so as to drive that pallet. The "A" pin actuator 140 is appropriately disposed so that the camming surface 170 thereon will cam the pin downwardly to deposit the pallet 38 at a proper position to enter the work station. The camming surface 170 on the "A" pin actuator 140 is sufficiently long to ensure that the "A" pin will remain down for the distance between the towing hole 80 and the forward edge of the pallet 38.

As previously indicated, each work station includes a sub-conveyor assembly adapted to transport the pallet with its load from a position on the main conveyor to the work position and back, the tongue 51 (Fig. 5) of the pallet 38 being engaged by the puller bars 52. Puller bars 52 are secured to a plate 190 (Figs. 4 and 5) which is in turn welded or otherwise affixed to a vertically extending plate 192. Plate 192 rotatably supports a series of rollers 194 which ride in a generally H-shaped track defined by plates 196, 198 and 200. These plates extend the length of the sub-conveyor section, plate 196 constituting a structural support member, and plate 200 being wider than plate 198 sufficiently to define lips against which the sides of the wheels 194 may ride to secure the transfer dolly plates 190 and 192 in position. The particular arrangement employed is not critical, the only requirement being that means be provided for permitting the controlled movement of the puller bars 52 longitudinally of the work station.

Figure 5:
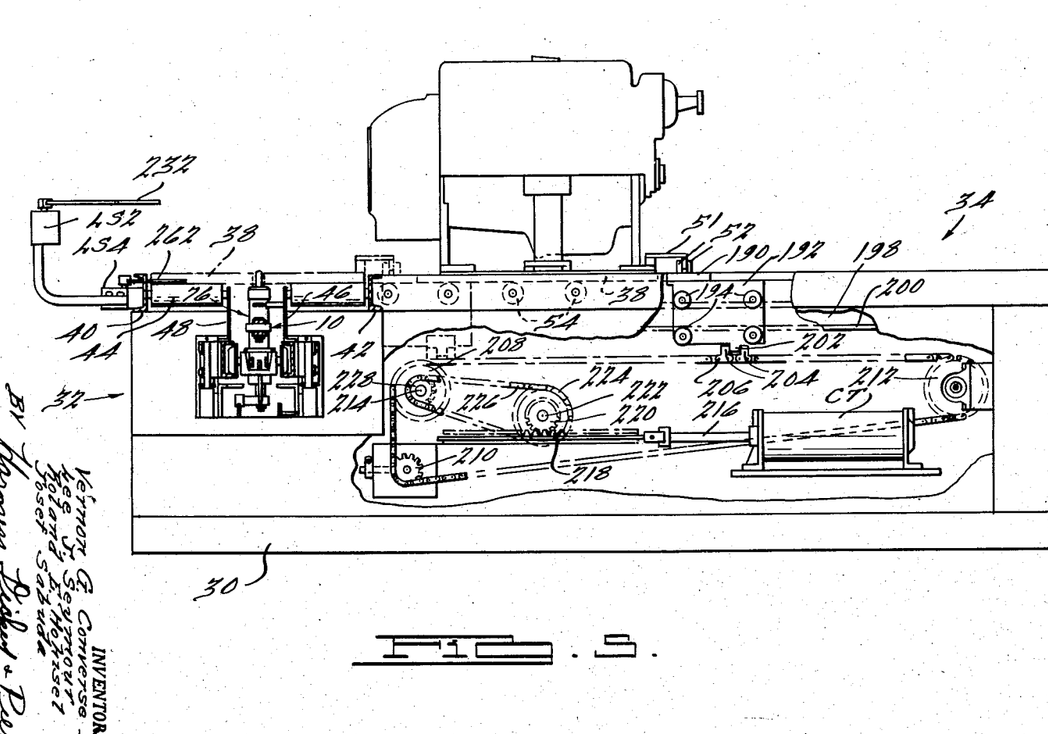
Fig. 5 is a vertical sectional view, partially cut away, taken substantially along the line 5—5 of Fig. 4.

As may best be seen in Fig. 5 of the drawings, plate 192 includes a projection 202 which is trapped between a pair of projections 204 mounted upon a transfer chain 206. Transfer chain 206 is trained around sprockets 208, 210 and 212, sprockets 208 being keyed to shaft 214. In order to rotatively drive shaft 214 in either of two directions, the piston rod 216 of a transfer cylinder CT is connected to a rack 218 adapted to drive a spur gear 220. A sprocket 224 is keyed to the same shaft 222 as is spur gear 220 and, hence, is rotated with and by spur gear 220 to rotate shaft 214 via drive chain 226 and sprocket 228. Transfer cylinder CT may be either pneumatically or hydraulically operated. In the disclosed arrangement, cylinder CT is representatively hydraulically controlled. It will be perceived that upon an extending or driving to the left of the piston rod 216, puller bars 52 will be moved from left to right, whereas upon retraction or moving to the right of the piston rod 216 the puller bars 52 will be moved from right to left.

Figure 15:
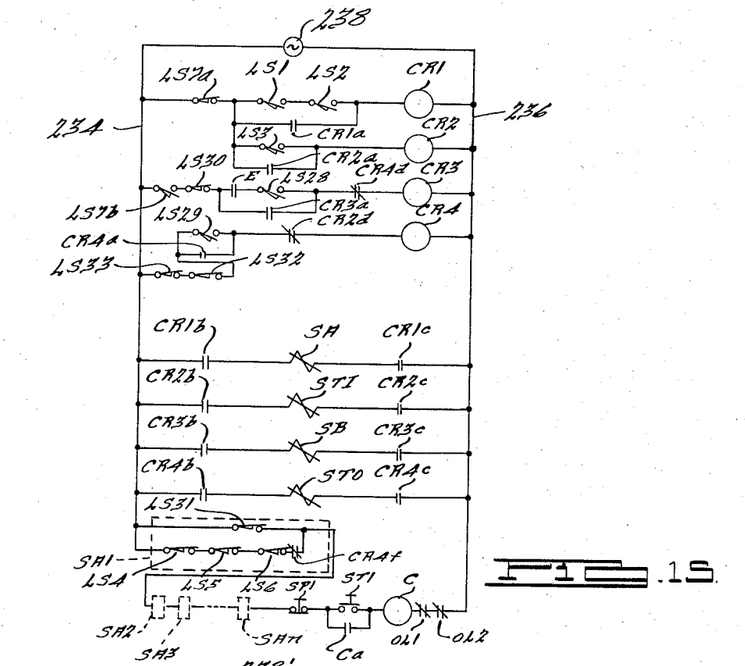
Fig. 15 is a schematic representation of an appropriate electrical system for controlling the operation of the equipment at any one work station, coupled with a representation of certain common control equipment.

As previously noted, at each work station, the selective movement of the "A" and "B" pins and the selective movement of the puller bars 52 is accomplished under the control of equipment individual to that work station. This control equipment includes a series of limit switches adapted and appropriately positioned to sense a plurality of desired conditions, the combination of existing conditions at any instant determining the operation of the mechanical elements. The physical location of the limit switches at each work station is represented in Figs. 2–7 of the drawings, the electrical circuitry embodying those limit switches is represented in Fig. 15 of the drawings, and the pneumatic and hydraulic elements controlled by the circuitry of Fig. 15 are represented in Fig. 14 of the drawing.

During the normal course of operation of the total equipment, at least some and normally substantially all of the "A" pins on the main conveyor chain 10 will be transporting pallets carrying untested, unprocessed or untreated workpieces. Normally, at least some of the "B" pins on the main conveyor chain 10 will be transporting pallets carrying completed workpieces in a condition to be unloaded from those pallets as will be described hereinafter. Assuming that the unloading operation is proceeding, there will normally also be at least some "B" pins vacant of pallets and available to accept pallets for transfer to the unload station.

Assuming the system to be in operation, the operation of the equipment at any one work station will be described upon an initial assumption that the work station is empty of a workpiece and is prepared to receive an untested or untreated workpiece.

As a pin approaches the station (from left to right in Figs. 2, 3 and 7, from top to bottom in Fig. 4, and from back to front in Figs. 5 and 6) transporting or not transporting a pallet, the pallet carrying or not carrying a workpiece, certain of the limit switches will be tripped. Under the initially assumed conditions, the only limit-switch tripping which has any operational significance at this instant is the arrival at the work station of an "A" pin transporting a pallet upon which a workpiece is being carried. The arrival at the work station of a "B" pin or of an "A" pin without a workpiece thereon will not produce any operational changes.

Each "A" pin assembly 76 (such as the one shown in solid line form in Fig. 6 of the drawings) arriving at the work station will trip limit switch LS1 (Figs. 6 and 7) by virtue of the engagement of the cam follower 126 thereon with the actuating arm of that limit switch. If that sensed "A" pin is not transporting a workpiece, the tripping of limit switch LS1 has no significance. If, however, that sensed pin is transporting a palletized workpiece, that workpiece, representatively an engine, will strike the projecting arm 232 (Figs. 2–7) of limit switch LS2. Both limit switches LS1 and LS2 include a normally open contact which is tripped to a closed position in the described fashion, the physical locations of those switches being such that they will be concurrently closed when an "A" pin carrying an engine arrives at the work station.

Limit switch LS7 (Figs. 4 and 6) is tripped only when a pallet is in the work station and, hence, under the assumed conditions, is not tripped. Limit switch LS7 includes two contacts one of which, LS7a (Fig. 15), is normally closed and the other of which, LS7b, is normally open. With switch LS7a closed, upon the closure of limit switches LS1 and LS2, the voltage appearing between conductors 234 and 236, as applied by a source representatively shown as an alternating current source 238, is applied across the winding of control relay CR1. Relay CR1 operates and closes its normally open contact CR1a to complete a locking or a sealing circuit for itself in shunt of limit switches LS1 and LS2 so that relay CR1 will remain operated despite the opening of either or both of the limit switches LS1 and LS2 so long as limit switch LS7 is not tripped.

Relay CR1, in operating, also closes its contacts CR1b and CR1c to energize and actuate solenoid SA. Solenoid SA controls a pneumatic valve VA (Fig. 14). Valve VA is adapted to control the pneumatic pressure differential, established by compressor CO, between the two sides of the piston of the cylinder CA. At any time that solenoid SA is not energized, valve VA is spring-biased to its shown position in which the pneumatic line 236 from compressor CO is connected to line 238 and so that line 240 is exhausted to the atmosphere. As a result, the piston rod of cylinder CA is normally in its retracted position, substantially as shown. However, upon the operation of solenoid SA, valve VA reverses these connections so that supply line 236 is connected to line 240 and so that line 238 is connected to exhaust to the atmosphere so that the piston rod of cylinder CA is driven to its extended position. Cylinder CA is the "A" pin actuator air cylinder, being the counterpart of cylinder 144 of the "A" pin actuator mechanism disclosed in Figs. 12 and 13 of the drawings. Hence, upon the extending of the piston rod of cylinder CA, the camming surface 170 (Fig. 6) of the "A" pin actuator mechanism 140 is moved downwardly to strike the camming surface 126 of the "A" pin assembly 76 to move the pin 78 downwardly out of engagement with the pallet 38. Hence, at this point, forward motion of the pallet 38 terminates, with that pallet being aligned with the sub-conveyor system in the work station.

Figure 7:
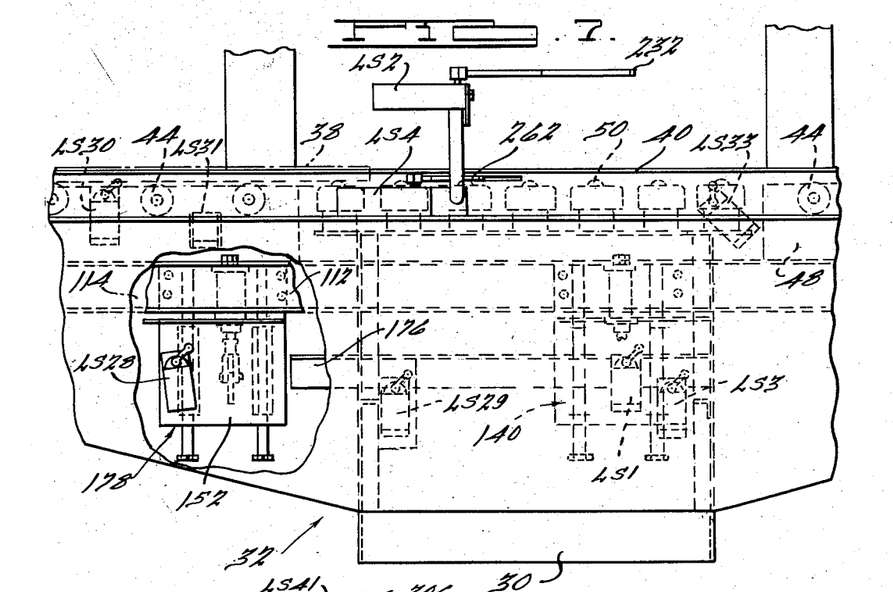
Fig. 7 is an end view, partially cut away, taken substantially in the direction of the arrow 7 in Fig. 4.

When the cam follower 126 of the selected "A" pin assembly 76 reaches its lowermost position, it will strike the actuating lever of limit switch LS3 (Figs. 6 and 7). Limit switch LS3 (Fig. 15), in closing, completes a circuit from conductor 234, contact LS7a, limit switch LS3, and through the winding of relay CR2 to conductor 236, energizing relay CR2. Relay CR2, in operating, closes its contact CR2a to establish a sealing circuit for itself in shunt of limit switch LS3, and closes its contacts CR2b and CR2c to energize the transfer-in solenoid STI. Solenoid STI controls the transfer-in valve VTI (Fig. 14).

Transfer-in valve VTI and transfer-out valve VTO are both spring biased to a normal position in which the air supply line 236 is blocked and in which lines 242 and 244, connected to opposite sides of the piston of the transfer control cylinder CTC, are connected to the atmosphere, and each valve is movable, when its individual solenoid is energized, to a position to connect the supply line 236 to line 242 or 244, respectively. Therefore, upon the energization of solenoid STI, valve VTI shifts to apply air pressure to the right side of cylinder CTC to cause the piston rod of cylinder CTC to be retracted to the left.

Cylinder CTC, pneumatically operated, controls the hydraulic control valve VT which, in turn, controls the transfer cylinder CT. Valve VT has three positions of operation and is biased, such as by a double-acting spring, so that when there is no pressure differential between the two sides of the piston of cylinder CTC, valve VT will assume its center position as shown. In this normal, closed-center position, hydraulic pump 248, reservoir 254, and both sides of the piston of the transfer cylinder CT are blocked. However, when the piston rod of the transfer control cylinder CTC is retracted to the left, as described, the spool of valve VT is shifted to connect pump 248 via lines 250 and 258 to the right-hand side of the piston of transfer cylinder CT and to connect the left-hand side of the piston of cylinder CT via lines 256 and 252 to the reservoir 254, extending the piston rod of transfer cylinder CT to the left.

As previously described, when the piston rod 216 (Fig. 5) of transfer cylinder CT is extended to the left, puller bars 52 are moved to the rear of the work station pulling the pallet therewith. It will be noted that the "A" pin will have cleared the towing hole in the pallet before this transfer operation occurs since the commencement of the transfer operation is conditioned upon the "A" pin being in its lower position to trip limit switch LS3.

It will be observed that when an "A" pin has been retracted to stop a pallet 38 at a position in front of a work station, a pallet carried by a succeeding pin (either an "A" pin or a "B" pin) could strike the stopped pallet and jam the machine. The same condition could occur if the selected pallet has not yet cleared the main conveyor line, on its way into the work station, when the next succeeding pin arrives. To insure that such jamming will not occur, the motor which drives the main conveyor chain 10 is controlled by means including limit switches at each of the work stations. Thus, that main conveyor chain drive motor (not shown) is controlled by contacts of contactor C (Fig. 15). The energizing circuit for contactor C includes normally closed overload switches OL1 and OL2 on the main conveyor drive motor, normally open starting button ST1 and normally closed stop button SP1. Assuming that the other elements in the energizing circuit for contactor C are in proper condition to permit energization of contactor C, upon the closure of start button ST1, contactor C is operated to close its contact CA to establish a sealing circuit in shunt of start button ST1 and to also close its contacts to start the main conveyor. However, a safety contact network is provided at each work station and these several networks are connected in series with one another in the energizing circuit of contactor C. Thus, safety network SA1 is associated with the work station at which the circuits shown thereabove in Fig. 15 are located and safety networks such as SA2 to SAn are located at other such work stations. Safety network SA1, representative of the others, includes a normally closed limit switch contact LS31 shunted by a series of normally closed contacts including contacts LS4, LS5, LS6 and CR4f. Limit switch LS31 (Figs. 4 and 7) is positioned to sense the arrival of any pin at a point just prior to the transfer area. Hence, each pin arriving at a point just short of the transfer area at each station will cause the momentary opening of limit-switch contact LS31 (Fig. 15). As a result, the energizing and sealing circuits for contactor C will be interrupted unless the contacts LS4, LS5, LS6 and CR4f at that station are closed at that instant.

Limit switch contact LS4 is closed unless there is a pallet in the transfer area. Thus, limit switch LS4 (Figs. 2–7) is provided with an arm 262 extending into the transfer area for sensing the presence or absence thereat of a pallet. Limit switches LS5 and LS6 (Figs. 2, 3, 4 and 6) are positioned along the sub-conveyor line in a position to be momentarily tripped to their open positions by any pallet passing thereover. Thus, limit switch LS5 will not be released to its closed position until a pallet has cleared the end of the sub-conveyor line adjacent the main conveyor line and limit switch LS6 will not be released until the pallet has reached substantially its final stopped position. Contact CR4f is closed unless relay CR4 is operated as will be better appreciated after the discussion of the functioning of relay CR4, the inclusion of contact CR4f in the safety network guards against the movement of a new pin into the transfer area after the signal has been received to transfer a pallet from the work station but before such transfer has occurred. The need for contact CR4f will arise only if there is a malfunctioning of the transfer mechanism.

Hence, if any of these conditions leading to the possibility of jamming exists, the main conveyor line will be stopped until the condition is corrected, whereas, if the system is operating properly, the main conveyor line will continue to run.

As the pallet reaches the work position, it trips limit switch LS7 (Figs. 4 and 6) to open contact LS7a and close contact LS7b (Fig. 15). The opening of limit-switch contact LS7a interrupts the holding circuit for relay CR1 and that relay releases, deenergizing solenoid SA. The deenergization of solenoid SA permits the spool of valve VA (Fig. 14) to return to its shown position, producing a retraction of the piston rod of cylinder CA to restore the "A" pin actuator mechanism to its normal position.

The opening of limit-switch contact LS7a (Fig. 15) also interrupts the holding circuit for relay CR2 and the resultant release of that relay produces a deenergization of the "transfer in" solenoid STI. The deenergization of solenoid STI permits valve CTI (Fig. 14) to restore to normal, reestablishing atmospheric pressure on opposite sides of the piston of valve CTC and, hence, permitting valve VT to restore to its shown position, terminating the movement of piston rod 216 (Fig. 5) of cylinder CT.

The workpiece is now in work position and any suitable operation may be performed thereon, such as, in the exemplary arrangement, the testing of the engine. The termination of the machining, processing or testing interval is signaled by the closure of contact E (Fig. 15). Contact E is closed by any suitable instrumentality, either automatically at the completion of an event, at the completion of a selected time interval, manually, or a combination of these. In a pragmatic embodiment of the invention, contact E is closed a preselected time interval after an inspector actuates a switch denoting the completion of his inspection. The closure of contact E is indicative of the fact that the work operation has been completed and that the workpiece is in condition to be transferred back to the conveyor line for transportation to the unloading station.

In order that succeeding work stations may be capable of discriminating between processed and unprocessed workpieces, as before stated, it is important, in the exemplary arrangement, that the completed workpiece in the work station be returned to the conveyor line and engaged by an empty "B" pin. Hence, the closure of contact E enables sensing means which sense and detect the arrival at a point just prior to the subject work station of a "B" pin which is not transporting a pallet. Limit switch LS28 (Figs. 6 and 7) is positioned to be tripped by the cam follower 126 on any "B" pin approaching the transfer area at the subject work station. Limit switch LS30 (Figs. 4 and 7) is positioned to be actuated by any pallet approaching the transfer area at the subject station.

Limit switches LS28 and LS30 are serially connected in an energizing circuit for relay CR3 (Fig. 15). Since limit switch LS28 is normally open, relay CR3 can be operated only if a "B" pin is approaching the transfer area, and since limit switch LS30 is normally closed, relay CR3 can be operated only if the "B" pin which trips limit switch LS28 is not transporting a pallet. When these conditions occur, relay CR3 is operated since limit switch contact LS7b is closed as previously noted, since contact E is closed as previously noted and since contact CR4d is closed inasmuch as relay CR4 is released at this time.

Relay CR3, in operating, closes its contact CR3a to complete a sealing circuit for itself in shunt of contact E and limit switch LS28, and closes its contacts CR3b and CR3c to energize solenoid SB. The energization of solenoid SB shifts the spool of valve VB (Fig. 14) to cause the piston rod of cylinder CB to be extended. Cylinder CB is the one of the cylinders 144 (Fig. 12) associated with the "B" pin actuator mechanism 178 (Figs. 6 and 7) as the subject work station. As a result, the camming surface 170 of that actuator mechanism 178 is moved downwardly to move the cam follower 126 of the sensed "B" pin downwardly, the "B" pin being held in its downward position by that camming surface and by the camming surface comprising the horizontal leg of the bridge 176, as previously noted.

Limit switch LS29 (Figs. 6 and 7) is positioned to sense the presence of the cam follower 126 of a "B" pin in the down position, and hence will be tripped to its closed position (Fig. 15) upon the aforesaid functioning of the "B" pin actuating mechanism. Limit switch LS29, along with limit switches LS32 and LS33, is in the energizing circuit for relay CR4. Limit switch LS32 is normally closed and is adapted to be tripped to its open position when any pin clears the transfer area (Figs. 4 and 6), and normally closed limit switch LS33 (Figs. 4 and 7) is adapted to be tripped to its open position by any pallet clearing the transfer area. Therefore, under normal operating conditions, at the instant that limit switch LS29 is closed as described, both limit switches LS32 and LS33 are also closed. Since relay CR2 is released as above described, its contact CR2d is now closed so that the energizing circuit for relay CR4 is completed.

Relay CR4, in operating, closes its contact CR4a to complete a sealing circuit for itself in shunt of limit switch LS29, and opens its contact CR4d to release relay CR3. Relay CR3, in releasing, deenergizes solenoid SB to permit valve VB (Fig. 14) to restore to its normal position to release the "B" pin actuator mechanism 178 (Fig. 6), the cam follower 126 of the subject "B" pin now being beyond the camming surface 170 and engaging the bridge 176. Relay CR4, in operating, also closes its contacts CR4b and CR4c (Fig. 15) to energize the "transfer out" solenoid STO which so shifts the spool of transfer out valve VTO (Fig. 14) as to create a pneumatic pressure differential in cylinder CTC to cause an extension of the piston rod of that cylinder to move the spool of valve VT to its rightmost position. In this position of valve VT, the hydraulic pump 248 is connected to the left-hand side of cylinder CT via lines 250 and 256, while the right-hand side of cylinder CT is connected to reservoir 254 via lines 258 and 252, producing a retraction of piston rod 216 (Fig. 5) of cylinder CT and a consequent movement of the pallet and load carried thereby from the work location to the transfer area.

The pallet, carrying its load, will arrive at the transfer area prior to the time that the cam follower 126 of the subject "B" pin assembly clears the bridge 176 (Figs. 6 and 7). When that cam follower passes the end of the bridge 176, the "B" pin will rise, engage the towing hole 80 in the pallet, and transport the pallet along the conveyor line.

As either the pin or the pallet clears the transfer area to trip limit switch LS32 or LS33, respectively, the locking circuit for relay CR4 (Fig. 15) is interrupted, and that relay releases to deenergize the transfer-out solenoid STO. The deenergization of solenoid STO permits the transfer-out valve VTO (Fig. 14) to restore to its shown position to reestablish atmospheric pressure on both sides of the transfer control cylinder CTC to permit valve VT to restore to its center position as shown, terminating the driving of cylinder CT, and leaving the piston rod of that cylinder in a retracted position in preparation for the next transfer of a pallet carrying an unprocessed workpiece into the work area.

Thus, in the described manner, an unprocessed workpiece upon a pallet being transported by an "A" pin is stopped in the transfer area adjacent the work station, and is transferred, with its pallet, into the work station. Upon the completion of the work operation, it is transferred back to the transfer area and is there engaged by a "B" pin to be towed along the main conveyor line.

At the load and unload station 24 (Fig. 1) the processed workpiece is removed from its pallet, the pallet is shifted from a "B" pin to an "A" pin and a new workpiece is loaded upon the pallet. It will be noted that it is not imperative that the processed workpiece be unloaded upon its first pass past the load and unload station, although such is desirable, nor is it essential that the transfer of the pallet from a "B" pin to an "A" pin be performed in any necessary spatial or time relation to the reloading of the pallet so long as that transfer occurs prior to the time that confusion could arise from the failure to transfer. Neither is it vital that each pallet be reloaded immediately its unloading.

Figure 8:
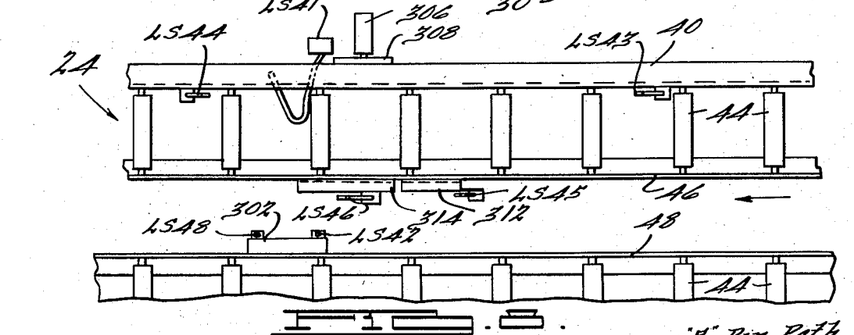
Fig. 8 is a fragmentary top plan view of the conveyor system at the loading and unloading station.
Figure 9:
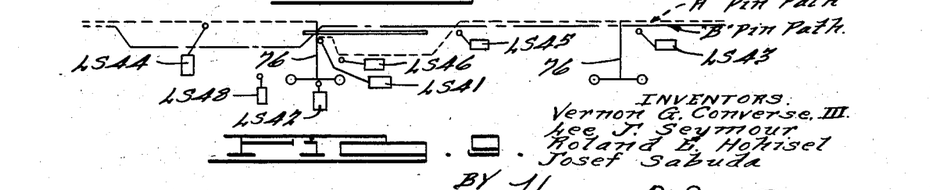
Fig. 9 is a functionlized representation of the side elevation of the equipment shown in Fig. 8, arranged to depict the location of certain of the control apparatus.
Figure 16:
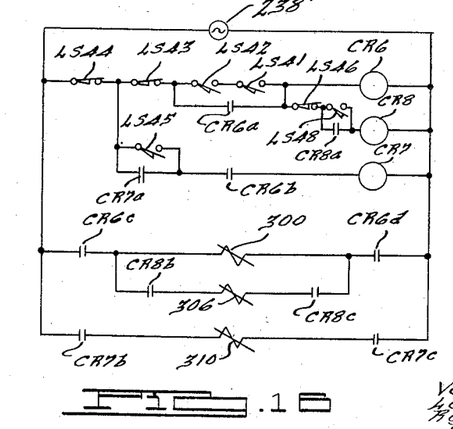
Fig. 16 is a schematic representation of an appropriate electrical control system for use at the loading and unloading station represented in Figs. 8 and 9 of the drawings.

A representative arrangement of a load and unload portion of the total conveyor system is schematically represented in Figs. 8 and 9 of the drawings, with an appropriate electrical control system being represented in Fig. 16. In the fragmentary plan view of Fig. 8, the structural members 40, 46 and 48 and the rollers 44 are similar to and extensions of the similarly designated members at the work station areas, hereinbefore described.

The equipment at the loading and unloading area is adapted to function only upon the arrival at that area of a "B" pin transporting a pallet and followed by an empty "A" pin. The side elevational schematic representation of Fig. 9 is designed to approximately represent in dashed lines the path of motion of the upper end of that "A" pin and in dash-dot lines the path of motion of the upper end of that "B" pin.

The aforesaid conditions precedent to the operation of the equipment at the loading and unloading station are sensed by certain of the limit switches the physical location of which is represented in Figs. 8 and 9 of the drawings. The arrival at the appropriate point in the work station of a "B" pin is sensed by limit switch LS42, limit switch LS41 is positioned to be tripped if that "B" pin is transporting a pallet, and limit switch LS43 is positioned to the rear (in the exemplary right-to-left direction of travel in Figs. 8 and 9) of the above-noted limit switches and is adapted to sense whether the succeeding "A" pin is or is not transporting a pallet. Limit switch LS42 (Fig. 16) is normally open and is tripped to its closed position by a "B" pin; limit switch LS41 is normally open and is tripped to its closed position if that "B" pin is transporting a pallet; and limit switch LS43 is normally closed and is tripped to its open position if the succeeding pin "A" is carrying a pallet. If the stated conditions are met, an energizing circuit is established for relay CR6 through normally-closed limit switch LS44 and the representative source of power 238'.

Relay CR6, in operating, closes its contact CR6a to establish a sealing circuit for itself in shunt of limit switches LS41 and LS42 and closes its contacts CR6c and CR6d to energize solenoid 300. Solenoid 300 is correlative of solenoid SB in Fig. 14 and serves to control, in a similar fashion, a cylinder (correlative of cylinder CB in Fig. 14 and cylinder 144 in Figs. 12 and 13) to operate the "B" pin actuating mechanism 302 (Fig. 8). Actuating mechanism 302 is, or may be identical in form to the mechanism represented in Figs. 12 and 13 of the drawings. As a result, the "B" pin is retracted from the pallet towing aperture, leaving the pallet at the load station.

As the "B" pin is retracted, the cam follower thereon trips limit switch LS48 (Figs. 8 and 9) completing a circuit (Fig. 16) through limit switches LS44 and LS43, now-closed contact CR6a, now-closed limit switch LS46, and limit switch LS48 to relay CR8. Relay CR8, in operating, closes its contact CR8a to complete a sealing circuit for itself in shunt of limit switch LS48 and closes its contacts CR8b and CR8c to energize solenoid 306. Solenoid 306 is adapted to control the inward movement of a clamping plate 308 (Fig. 8) which engages the pallet and retains it against movement. Solenoid 306 may directly control plate 308 or may operate through hydraulic or pneumatic control means. This clamping of the pallet in position facilitates the loading operation.

As the "B" pin cam follower clears the mechanism 302, that pin is permitted to restore to its upper position and advances along the conveyor empty of a pallet.

As the succeeding, empty "A" pin approaches the trailing edge of the pallet, the cam follower thereon trips limit switch LS45 (Figs. 8 and 9) which completes a circuit (Fig. 16) through limit switch LS44 and now-closed contact CR6b to operate relay CR7. Relay CR7, in operating, closes its contact CR7a to establish a sealing circuit for itself in shunt of limit switch LS45 and closes its contacts CR7b and CR7c to energize solenoid 310. Solenoid 310 is correlative of solenoid SA (Fig. 14) and controls a similar system to operate the "A" pin actuating mechanism 312 (Fig. 8).

The "A" pin is thereby retracted and is held in its retracted position by means such as a bridge 314, correlative to bridge 176 shown in Figs. 6 and 7 of the drawings. As the "A" pin cam follower approaches the left-hand end of bridge 314, approaching a position underlying the towing aperture in the pallet, limit switch LS46 is tripped by the cam follower of that pin which opens the sealing circuit (Fig. 16) of relay CR8, releasing that relay. Relay CR8, in releasing, deenergizes solenoid 306 to release the clamping mechanism 308 at a time just prior to the instant that the "A" pin engages the towing aperture in the pallet.

As the cam follower of the "A" pin clears the left end of bridge 314, the pin is permitted to rise to engage the towing aperture in the pallet and carry the pallet, which may now be loaded with an unprocessed workpiece, along the conveyor line. This pallet, in advancing along the conveyor line, trips limit switch LS44 which restores all circuits (Fig. 16) to normal.

Thus, a pallet carrying a processed workpiece has been transferred from a "B" pin to an "A" pin, has been unloaded of its processed workpiece, and has been loaded with an unprocessed workpiece in preparation for delivery of that workpiece to one of the work stations along the conveyor line.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In a conveyor system, a station, a chain movable past said station, a member to be transported positionable in space proximity to said chain, a cam follower, a pin body secured to and movable with said chain, a pin within said pin body and slideable therein transversely of said chain into selective engagement with said member for moving said member, said pin being connected to and movable with said cam follower, a camming surface at said station, movable actuating means engageable with said cam follower for moving said cam follower into a position to engage said camming surface, and means at said station for selectively moving said actuating means.

2. In a conveyor system, a station, a chain movable past said station, a cam follower, a pin body secured to and movable with said chain, a pin within said pin body and slideable therein transversely of said chain between a first and a second position, said pin being connected to and movable with said cam follower, a camming surface at said station engageable by said cam follower for holding said pin in said second position, movable actuating means at said station engageable with said cam follower for selectively moving said cam follower into a position to engage said camming surface, and a member to be transported by said chain and pin positioned in spaced proximity to said chain and engageable by said pin only when said pin is in a certain one of said positions.

3. In a conveyor system, a station, a chain movable past said station, a plurality of pusher elements on said chain each of which is supported for movement both with said chain and transversely of said chain, sensing means at said station for sensing the presence of any one of certain of said elements adjacent said station, sensing means at said station for sensing the presence of any one of certain others of said elements adjacent said station, and means at said station controlled by said sensing means for alternately moving one of said certain of said elements transversely of said chain and one of said certain others of said elements.

4. In a conveyor system, a station, a chain movable past said station, a plurality of pusher elements on said chain each of which is supported for movement both with said chain and transversely of said chain, sensing means at said station for sensing the presence of any one of certain of said elements adjacent said station, actuating means at said station controlled by said sensing means for moving said any one element transversely of said chain, and means at said station separate from said actuating means for retaining the moved element in its moved position for substantially the entire length of travel of said moved element past said station.

5. In a conveyor system, a station, a chain movable past said station, a first and a second plurality of uniquely different pusher elements on said chain each of which is supported for movement both with said chain and transversely of said chain, a work carrier positionable in spaced proximity to said chain and engageable by any one of said pusher elements, sensing means at said station for sensing the presence of said work carrier adjacent said station, means at said station controlled by said sensing means and effective only if said work carrier is engaged by one of said first plurality of pusher elements for moving said one of said pusher elements transversely of said chain to disengage said one of said pusher elements from said work carrier, means at said station for transferring said carrier into said station, means at said station for transferring said carrier from said station, and means for moving one of said second plurality of pusher elements transversely of said chain to bring said different one of said pusher elements into engagement with said work carrier.

6. In a conveyor system, a plurality of work stations at all of which a similar work operation is performed, a plurality of work carriers certain of which are carrying workpieces upon which said work operation is yet to be performed and others of which are carrying workpieces upon which said work operation has been performed, conveyor means for moving said carriers in a line past all of said stations, means including sensing means at each of said stations for selecting one of said certain work carriers, and means for moving said selected work carrier from said conveyor means into said work station.

7. In a conveyor system, a plurality of work stations at all of which a similar work operation is performed, a plurality of transporting means each adapted to move workpieces in a line adjacent said work stations, means uniquely distinguishing each of the transporting means in one group of said transporting means from each of the transporting means in another group of said transporting means, and means at each of said work stations including means for sensing the arrival at the individual work station of one of said one group of transporting means for moving one of the workpieces associated with said one of said one group of transporting means into said work station.

8. In a conveyor system, a plurality of work stations at all of which a similar work operation is performed, a plurality of transporting means each adapted to move workpieces in a line adjacent said work stations, means uniquely distinguishing each of the transporting means in one group of said transporting means from each of the transporting means in another group of said transporting means, means at each of said work stations including means for sensing the arrival at the individual work station of one of said one group of transporting means for moving one of the workpieces associated with said one of said one group of transporting means into said work station, and means at each of said work stations for moving a completed workpiece from said work station to one of said other group of transporting means.

9. In a conveyor system, a station, a chain movable past said station, first and second pluralities of uniquely different pusher elements carried by said chain, a plurality of work carriers each engageable and movable by any one of said pusher elements, means at said station for dissociating one of said work carriers only from one of said first plurality of pusher elements, and means at said station for associating said one of said work carriers only with one of said second plurality of pusher elements.

10. In a conveyor system, a station, a chain movable past said station, first and second pluralities of pusher elements carried by said chain, a plurality of work carriers each engageable and movable by any one of said pusher elements, means at said station for dissociating one of said work carriers from one of said first plurality of pusher elements and moving said one of said work carriers into said station, and means at said station for moving said one of said work carriers out of said station and associating said one of said work carriers only with one of said second plurality of pusher elements.

11. In a conveyor system, a station, a chain movable past said station, a plurality of work carriers, first and second pluralities of pusher elements carried by said chain, all of said pusher elements being adapted to engage and move said work carriers, at least certain of said second plurality of pusher elements being at times dissociated from work carriers, means at said station for dissociating one of said work carriers from one of said first plurality of pusher elements, and means at said station for associating said one of said work carriers with one of said certain ones of said pusher elements.

12. In a conveyor system, a station, a chain movable past said station, a plurality of work carriers, first and second pluralities of pusher elements carried by said chain, all of said pusher elements being adapted to engage and move said work carriers, at least certain of said second plurality of pusher elements being at times dissociated from work carriers, means at said station for dissociating one of said work carriers from one of said first plurality of pusher elements and moving said one of said work carriers into said station, and means at said station for moving said one of said work carriers out of said station and associating said one of said work carriers with one of said certain ones of said pusher elements.

13. In a conveyor system, a plurality of similar work stations, a loading and unloading station, a chain movable past said stations, a first and a second plurality of pins movable by said chain, a plurality of work carriers engaged and moved by said first plurality of pins, means at said work stations for transferring said work carriers from said first plurality of pins to said second plurality of pins, and means at said loading and unloading station for transferring said work carriers from said second to said first plurality of pins.

14. In a conveyor system, a chain, first and second groups of pusher elements moved by said chain, the pusher elements of said groups being alternated along said chain, work carriers engageable with and movable by said pusher elements, and means effective when one of said work carriers is engaged by one of said first group of pusher elements and when the adjacent one of said second group of pusher elements is disengaged from any of said work carriers for transferring said one of said work carriers to said one of said second group of pusher elements.

15. In a conveyor system for transporting work carriers to and from a plurality of work stations at all of which a similar work operation is performed, a conveyor movable in a continuous path adjacent all of the work stations, a plurality of pusher elements on said conveyor engageable with the work carriers for moving the work carriers over said continuous path, sensing means at each work station for sensing the arrival adjacent the work station of one of said elements which is moving a work carrier, sensing means at each work station for sensing when the station is empty of any work carrier, means conjointly controlled by said sensing means for disassociating said one element from the work carrier, and conveyor means at the work station for moving the work carrier into the work station.

16. The combination of claim 15 in which each of said pusher elements is movable both with and transversely of said conveyor and in which means are provided at each of the work stations for moving said pusher elements transversely of said conveyor for disassociating the work carrier from the pusher element.

17. In a conveyor system for transporting work carriers to and from a plurality of work stations at all of which a similar work operation is performed, a conveyor movable in a continuous path adjacent all of the work stations, a plurality of pusher elements on said conveyor engageable with the work carriers for moving the work carriers over said continuous path, some of said elements being disengaged from any work carriers at any time, sensing means at each work station for sensing the arrival adjacent the work station of one of said elements which is disengaged from a work carrier, and conveyor means at each work station controlled by said sensing means for moving a work carrier from the work station to said path and into association with said one of said elements.

18. In a conveyor system for transporting work carriers to and from a plurality of work stations at all of which a similar work operation is performed, a conveyor movable in a continuous path adjacent all of the work stations, a first and a second plurality of uniquely different pusher elements on said conveyor engageable with the work carriers for moving the work carriers over said continuous path, some of said elements being disengaged from any work carriers at any time, means at each of the work stations effective when the work station is empty for disassociating a work carrier only from one of said first plurality of pusher elements and moving the work carrier into the work station, and means at each of the work stations for moving the work carrier from the station to said path and into association only with one of said second plurality of pusher elements.

19. In a conveyor system for transporting work carriers to and from a plurality of work stations at all of which a similar work operation is performed and to and from a load and unload station, a conveyor movable in a continuous path adjacent all of the work stations and adjacent the load and unload station, a first and a second plurality of uniquely different pusher elements on said conveyor engageable with the work carriers for moving the work carriers over said continuous path, some of said elements being disengaged from any work carriers at any time, means at each of the work stations effective when the work station is empty for disassociating a work carrier only from one of said first plurality of pusher elements and moving the work carrier into the work station, means at each of the work stations for moving a work carrier from the station to said path and into association only with one of said second plurality of pusher elements, and means at said load and unload stations for transferring work carriers from association with said second plurality of pusher elements to association with said first plurality of pusher elements.

References Cited in the file of this patent

UNITED STATES PATENTS

| 1,263,043 | Curtis | Apr. 16, 1918 |
| 2,640,580 | De Burgh | June 2, 1953 |
| 2,717,087 | Auger | Sept. 6, 1955 |

FOREIGN PATENTS

| 1,037,216 | France | Apr. 29, 1953 |

UNITED STATES PATENT OFFICE
CERTIFICATE OF CORRECTION

Patent No. 2,884,113                                April 28, 1959

Vernon G. Converse III et al

It is hereby certified that error appears in the printed specification of the above numbered patent requiring correction and that the said Letters Patent should read as corrected below.

Column 1, line 38, for "pass" read -- past --; column 15, lines 27 and 28, should read as shown below instead of as in the patent:

and one of said certain others of said elements
        transversely of said chain.

Signed and sealed this 6th day of October 1959.

(SEAL)
Attest:

KARL H. AXLINE                              ROBERT C. WATSON
Attesting Officer                          Commissioner of Patents